Feb. 28, 1950     G. MILLER     2,499,325
FILTERING APPARATUS

Filed June 7, 1947     2 Sheets-Sheet 1

INVENTOR
GEORGE. MILLER
BY Fetherstonhaugh & Co.
ATTORNEYS

Feb. 28, 1950  G. MILLER  2,499,325
FILTERING APPARATUS
Filed June 7, 1947  2 Sheets-Sheet 2

INVENTOR
GEORGE. MILLER
BY Fetherstonhaugh & Co.
ATTORNEYS

Patented Feb. 28, 1950

2,499,325

UNITED STATES PATENT OFFICE 2,499,325

FILTERING APPARATUS

George Miller, Rockton, Ontario, Canada, assignor to Francis Hankin & Co. Limited, Montreal, Quebec, Canada Application June 7, 1947, Serial No. 753,342

4 Claims. (Cl. 210—148)

This invention relates to improvements in water filtering apparatus and more particularly to an improved false bottom underdrain for filter tanks.

In a filter tank it is desirable to obtain uniform drainage of the filtered water throughout the filter bed. It is equally desirable, in the back-washing of the filter bed, to provide a reverse flow of water which will be uniformly distributed throughout the filter bed with a minimum amount of disturbance to the filtering media.

A principal object of this invention, therefore, is to provide a filter bed false bottom with an underdrainage system consisting of a plurality of underdrain chambers arranged in parallel courses in combination with an effluent conduit extending transversely beneath and in communication with the underdrain chambers at the central portion thereof, whereby the filtered water will have a uniform downward flow throughout the bed through the underdrain chambers and into the effluent conduit, the underdrain chambers being so constructed and disposed in relation to the conduit that a reverse flow of water will be evenly distributed throughout the drainage system in such a matter as to provide uniform back flow throughout the filter bed when the filter bed is given its periodic washings.

Another object is to provide a filter bed flooring with spaced longitudinally extending raised filter boxes opening downwardly into the underdrain chambers, said filter boxes being separated by longitudinally extending filter bed channels into which the filtered water is collected to flow through means provided in the side walls of the filter boxes to the underdrainage system.

A further object of this invention is to provide laterally extending filter ports arranged at predetermined intervals in the side walls of the underdrain chambers, which ports are in communication with the underdrain chambers and the filter bed to admit uniform passage throughout the filter bed of the filtered water to the drainage system, said ports being angularly arranged with respect to the flow through the underdrain chambers so that a reverse flow of water will be evenly distributed throughout the filter bed.

A still further object of this invention is to provide baffle means arranged in the underdrainage chambers whereby the reverse flow current is broken in the vicinity of the filter ports during the backwashing operation.

The above and other objects of this invention will be more readily understood from the following detailed description of which reference will be had to the accompanying drawings, in which—

Figure 1:
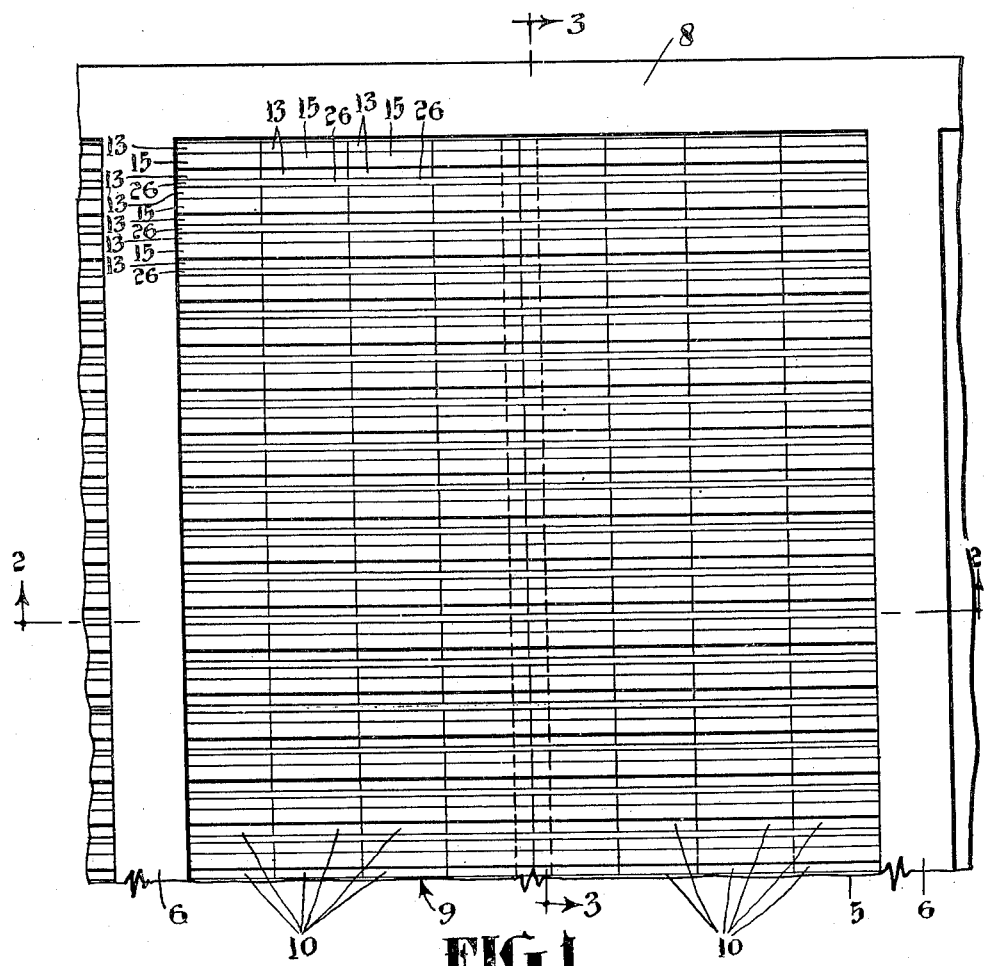
Fig. 1 is a top plan view showing a section of a filter tank with a false bottom embodying my invention arranged thereon.
Figure 2:
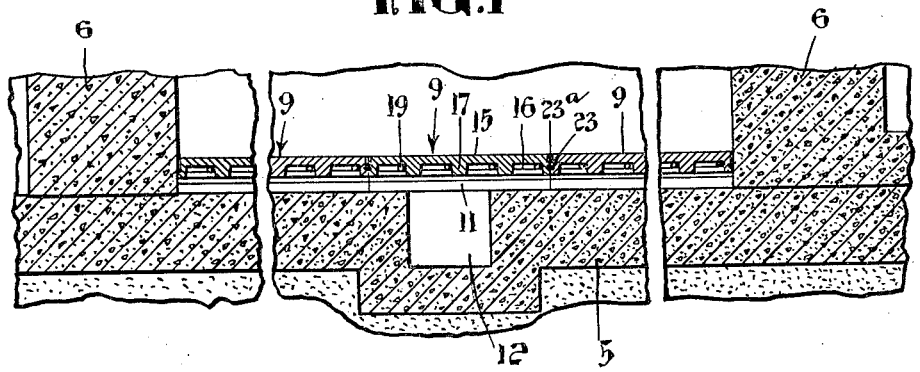
Fig. 2 is an enlarged broken sectional view taken along the lines 2—2 of Fig. 1 and showing the blocks arranged in end-to-end relation.
Figure 3:
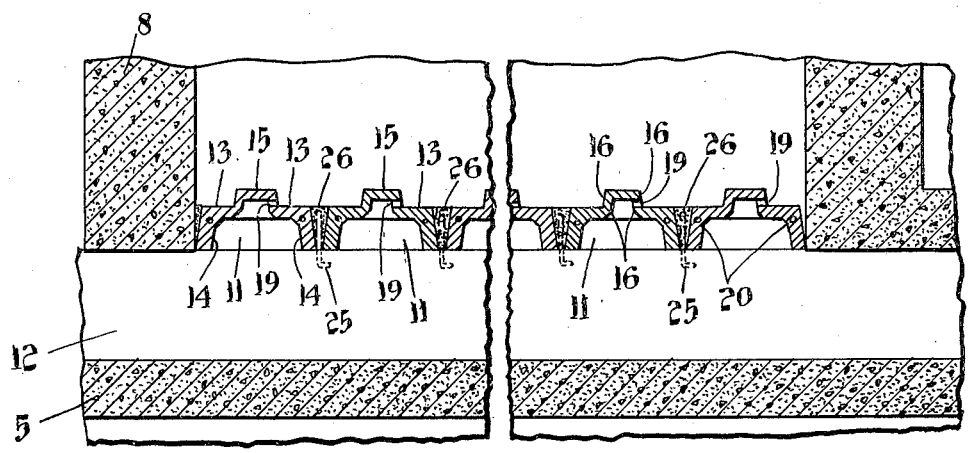
Fig. 3 is an enlarged broken sectional view along the lines 3—3 of Fig. 1 and showing the blocks arranged in side-by-side relation.
Figures 4, 5:
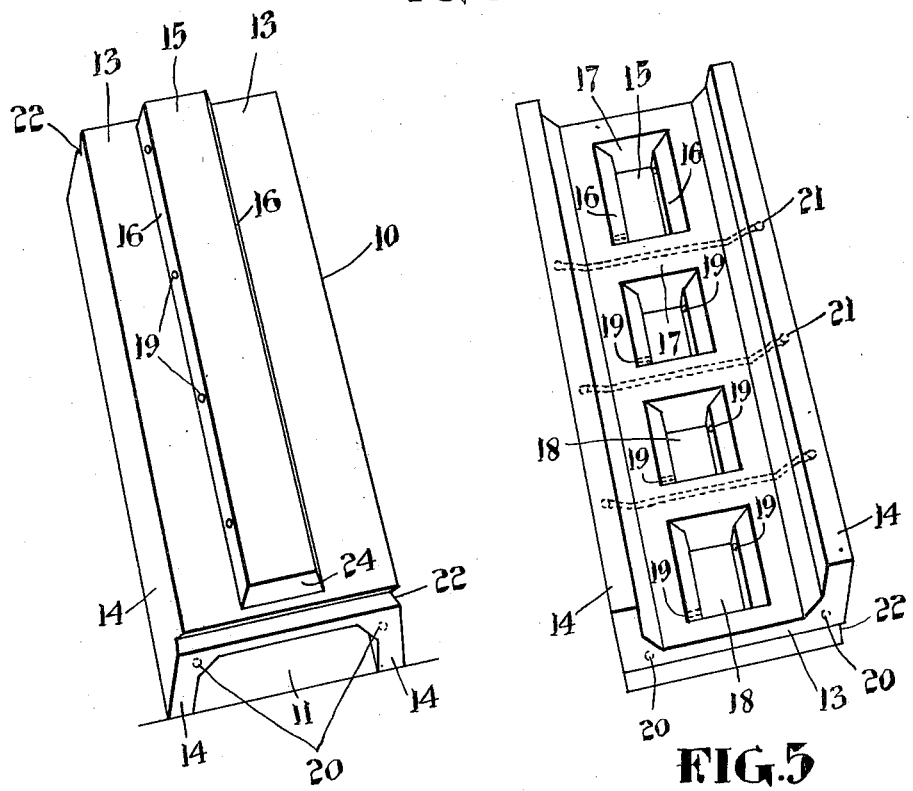
Fig. 4 is a perspective view of a block as it appears when looking at the outer surface.
Fig. 5 is a perspective view of a block as it appears from the channel side.

Referring more particularly to the drawings, Fig. 1 discloses a filter tank including a suitable base 5, side walls 6 and end wall 8. Base 5 supports a false bottom generally indicated at 9 upon which the filter media is placed to a predetermined level above the false bottom. The false bottom consists of a plurality of channel shaped blocks 10 having their channels facing downwardly. The blocks are disposed in end-to-end and side-by-side relation to form a plurality of underdrain channels 11 arranged in parallel courses. Each channel 11 extends from one side wall 6 to the correspondingly numbered opposing side wall. An effluent conduit 12 is provided in the base 5 to extend transversely beneath and in communication with the parallel courses of underdrain channels at the central portion thereof.

The blocks 10 are preferably molded of non-porous concrete or other suitable material into channel or trough shaped blocks to provide a bridging wall 13 and flanking side walls 14 angularly disposed from the bridging wall in spread-apart relation. The bridging wall is recessed in the central portion to provide a filter box having top and side walls 15 and 16 respectively. Transversely extending baffle walls 17 divide the filter box into a plurality of compartments 18, said walls 17 forming the end sections of each compartment. Each compartment has an open face which is directed downwardly into the channel portion of the block. The side walls 16 of compartments 18 taper inwardly at two distinct angles from the inner surface of bridging wall 13 to the inner surface of the compartment top wall 15, the angle of taper from the inner surface of bridging wall 13 to approximately one third the height of said side walls being substantially more obtuse than the angle of taper of the remaining two thirds of said side walls.

Laterally extending filter ports 19 are provided in the side walls 16 of the filter box. The ports are disposed preferably in staggered relation on the opposed side walls so that the port on one side wall will be relatively close to one end wall 17 of a compartment 18 and the port on the opposing wall will be relatively close to the opposing end wall of said compartment. Ports 19 project through said side walls 16 on a horizontal plane adjacent the outer surface of the bridging wall 13 to permit lateral flow of the filtered water, which has collected on said outer surface, into the filter box and thence to the underdrainage system.

Each block is preferably strengthened by reinforcing means. In the present instance I have provided longitudinally extending reinforcing bars 20 positioned at the juncture of the bridging wall 13 and each side wall 14. Reinforcing stirrups 21 may also be arranged in the transverse direction of the block with their bight portion embedded in the baffle walls 17 and their arms projecting in the depthwise direction of the side walls 14. The ends of the blocks are rabbeted in the bridging section to provide a transversely extending V-shaped recess 22.

As hereinbefore stated, the blocks are laid in end-to-end and side-by-side relation on the base 5 of the filter tank. The blocks are disposed with their channels facing downwardly to provide a series of parallel courses of underdrain channels extending from one side wall 6 to the correspondingly numbered opposing side wall of the filter tank. The adjacent ends of the blocks are secured together by a suitable bonding agent, indicated at 23, which is inserted between the rabbeted portions 22 of opposing end surfaces of each adjacent block. The end edges 24 of the filter boxes are preferably stepped back from the ends of the block a distance approximately equal to the depth of rabbeted portions 22. Thus a bonding agent 23a may also be inserted between said opposing end edges 24 of adjacent blocks to further ensure that the blocks will be secured in end-to-end relation. The blocks in their side-by-side relation, owing to the spread-apart angle of the side walls 14, have the opposing side wall surfaces of adjacent blocks disposed in substantially contact engagement at their lower marginal edges while the surfaces adjacent the bridging wall portion 13 are relatively widely spaced apart, thus providing a V-shaped recess between the said opposing side wall surfaces. In the preferred embodiment of this invention I have provided U-shaped anchoring hooks 25 between said side walls. These anchoring hooks have the lower portion of their arms embedded in the base 5 and their upper portion, including the bight section, projecting into the said V-shaped recess defined by the sloping side walls 14. A bonding agent, indicated at 26, is inserted in the aforesaid recess to the level of the outer surface of bridging walls 13. The bonding agent forms an inverted V-shaped wedge which, being secured against displacement by anchoring hooks 25, fastens the blocks to the base 5 of the filter tank. In constructing my blocks I have made provision for spacing the filter boxes of each course far enough apart to permit a shovel to be passed along the bottom flooring provided by the outer surface portions of the bridging walls between adjacent filter boxes.

When the water has filtered through the filtering media to the false bottom flooring it flows through the laterally extending filter ports 19 in the side walls of the filter box and thence into the underdrain channels 11 where it is carried to the effluent conduit 12. Since the filtering media is held to the false bottom flooring by the downward pressure exerted thereon, the lateral flow of the filtered water into the underdrainage system is effected with little if any displacement of the filtering media. This lateral drainage from the filter bed has considerable advantages over the vertical drainage systems hitherto employed.

In the use of the vertical drainage systems, a particular problem to contend with has been to eliminate the filtering media in the drained off filtered water, which filtering media has tended to follow along with the downward flow of the filtered water into the drainage system. Another serious problem, as a result of the natural tendency of the filtering media to follow the vertical flow of the filtered water, has been in the clogging of the vertical drainage ports. In the event that a considerable number of ports become blocked, the uniform drainage of the filter bed becomes seriously hampered. With my present system of lateral drainage of the filtered water from the filter bed bottom, the tendency of the filtering media to follow the lateral flow of the filtered water into the underdrainage system is overcome by the overhead pressure on the filtering media. Thus the filtering media will remain undisturbed on the false bottom flooring while the filtered water, without conveying particles of the filtering media, is allowed to flow into the underdrainage system.

When it is desired to wash the filtering system, filtered water is forced upwardly under pressure through the effluent conduit 12, into the underdrain chambers 11, rising in the filter box compartments 18 and thence to the filter bed through the lateral filter ports 19. With the lateral communication system it will be seen that the conduit 12 will have to be filled to its capacity before the back flow enters the underdrain chambers 11. Since the conduit 12 is disposed at right angles below the central communication openings in the underdrain channels 11, lateral flow of water will commence in opposing directions in all of the underdrain channels simultaneously. The disposition of the underdrain channels at right angles to the effluent conduit tends to break the force of the back flow of water. In a like manner all of the courses of the underdrain channels will have to be completely filled before any water will enter the filter box compartments 18. In this connection it will be seen that the transversely disposed baffle walls 17 minimize the possibility of any of the compartments 18 being flooded, due to excessive flow of water, before the channels are all completely filled. The arrangement of the baffles is such that the water in the channels must rise into the filter box compartments from the overflow of the channels, and, since this can only be effected when the channels are completely filled, it will be apparent that the filling of the filter box compartments will be uniform throughout the system. When the water has risen to a predetermined level in the filter box compartments it is allowed to flow out through the lateral filter ports 19 into the filter bed. By providing a simultaneous flow of water through all of the ports 19 and under an even pressure throughout, it will be seen that the entire filter bed will be flushed at the same time.

Although the baffles 17 serve to break the flow in the underdrain channels 11 before entering the filter box compartments 18, the filter ports 19 are disposed at right angles to the flow of water in said channels to further ensure that the force of the flow of water will be completely broken before entering into the filter ports. In this manner jetting of the water into the filter bed is precluded so that undesirable disturbance of the filtering media is overcome during the backwashing operation.

I claim:

1. In a water filtering apparatus of the character described, the combination of a supporting base, a false bottom mounted thereon to provide an underdrainage system, and a filter bed carried by said false bottom, said false bottom comprising a plurality of channel shaped blocks mounted on the supporting base with their channels facing downwardly and arranged in side-by-side and end-to-end relation to provide a plurality of parallel underdrain channels of substantial width, said blocks being shaped to provide a horizontal bridging wall and downwardly directed flanking side walls angularly disposed from the bridging wall in spread apart relation to provide a V-shaped recess between opposing side walls of adjacent blocks for the reception of a bonding agent therebetween, said underdrain channels being provided with parallel overhead filter box compartments having side walls and solid top walls formed integrally with said blocks in the central portion of the bridging wall, said compartments projecting into the filter bed with the compartments of one channel in spaced parallel relation to the compartments of adjacent channels, each compartment having an open face directed downwardly through the bridging wall into the channel portion of the block, and laterally extending filter ports arranged in the side walls of the compartments to permit lateral flow of filtered water from the filter bed to the filter box and thence to the communicating underdrain channel.

2. A water filtering apparatus as set forth in claim 1 including an effluent conduit extending transversely beneath the underdrain channels at the central portion thereof, said effluent conduit extending through the supporting base with its upper face in direct communication with the parallel courses of underdrain channels at the central portion thereof.

3. A water filtering apparatus as set forth in claim 1, including vertically disposed transversely extending baffle walls interposed between adjacent compartments to prevent lateral flow of water through adjacent compartments in a direction parallel to the flow of water in said underdrain channels.

4. A water filtering apparatus as set forth in claim 1, in which the ends of each block are rabbeted in the bridging section to provide a transversely extending V-shaped recess whereby opposing end surfaces of the blocks are secured together by a bonding agent which is inserted between the rabbeted portions of said opposing surfaces.

GEORGE MILLER.

REFERENCES CITED

The following references are of record in the file of this patent:

UNITED STATES PATENTS

| Number | Name | Date |
| --- | --- | --- |
| 641,197 | Ducat | Jan. 9, 1900 |
| 730,518 | Davis | June 9, 1903 |
| 1,687,782 | Norton | Oct. 16, 1928 |
| 1,698,079 | Wagner | Jan. 8, 1929 |
| 2,046,298 | Wood | June 30, 1936 |
| 2,084,351 | Luce | June 22, 1937 |
| 2,161,999 | Christie et al. | June 13, 1939 |
| 2,378,239 | Myron | June 12, 1945 |

FOREIGN PATENTS

| Number | Country | Date |
| --- | --- | --- |
| 7,455 | Great Britain | 1904 |
| 5,850 | Great Britain | 1906 |
| 14,542 | Great Britain | 1906 |
| 27,232 | Great Britain | 1906 |
| 401,776 | Great Britain | Nov. 23, 1933 |
| 500,378 | Great Britain | Feb. 8, 1939 |